May 8, 1928.
R. D. STROUP
BRAKE MECHANISM
Filed July 25, 1923
1,668,876
3 Sheets-Sheet 1
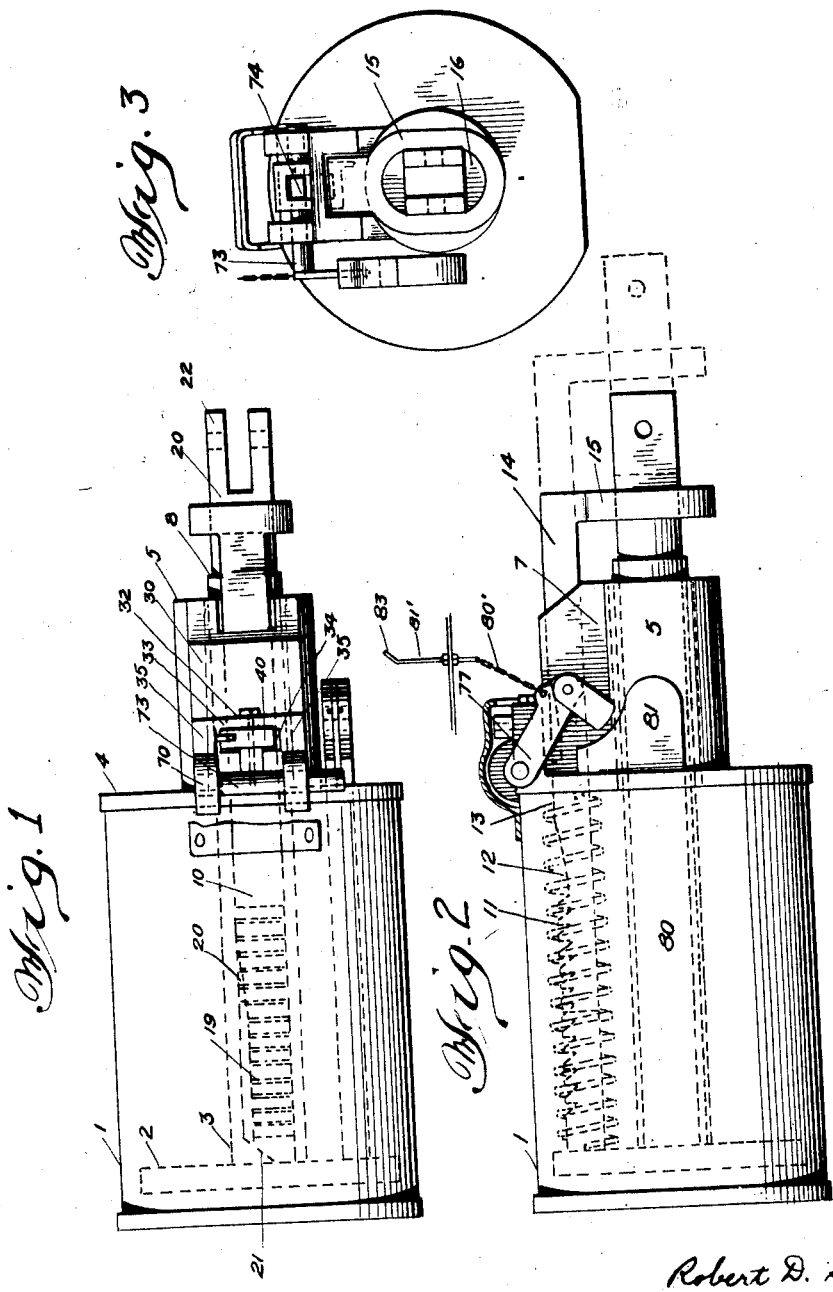
Inventor
Robert D. Stroup
By Sol Shappirio
Attorney May 8, 1928.  
R. D. STROUP  
1,668,876  
BRAKE MECHANISM  
Filed July 25, 1923  
3 Sheets-Sheet 2
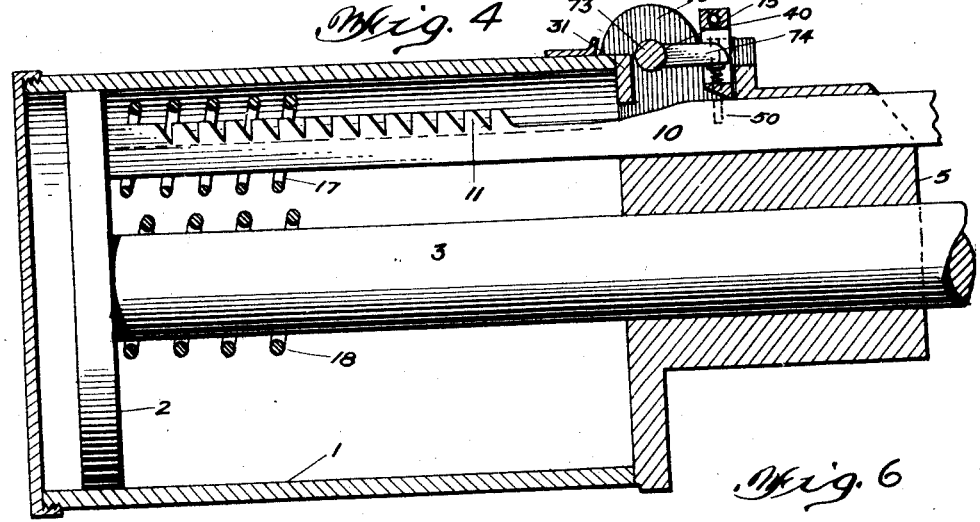
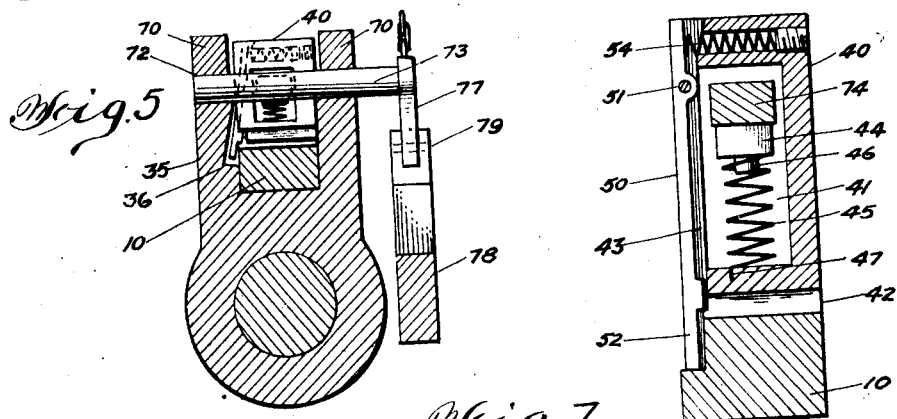
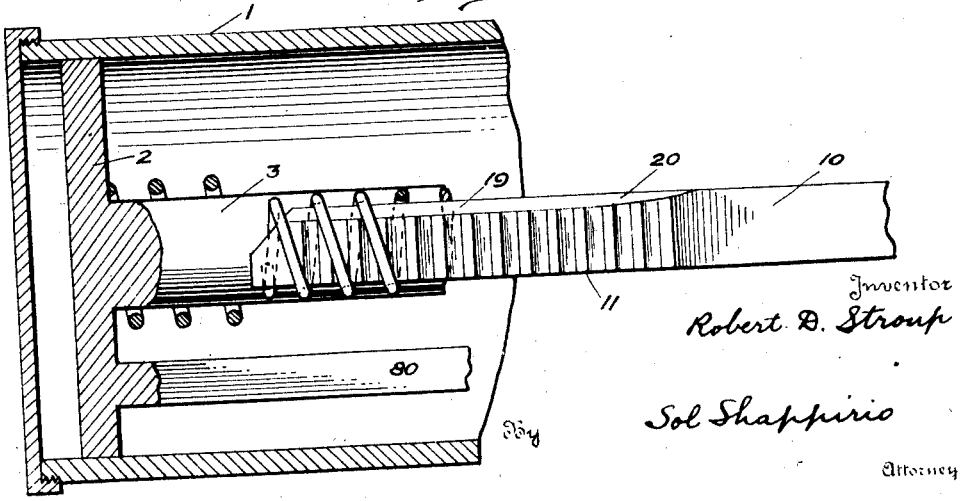
Inventor  
Robert D. Stroup  
By Sol Shappirio  
Attorney

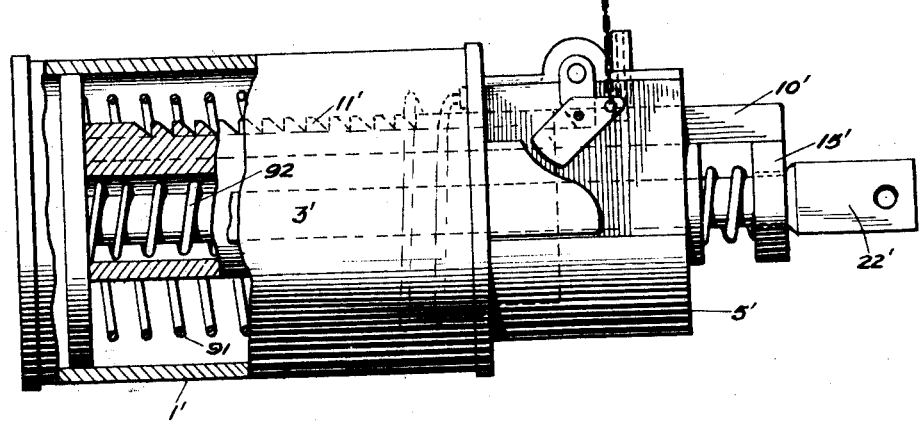
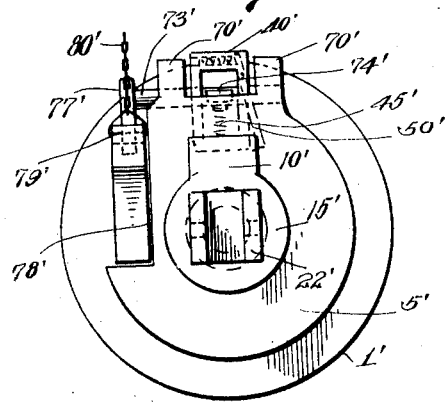
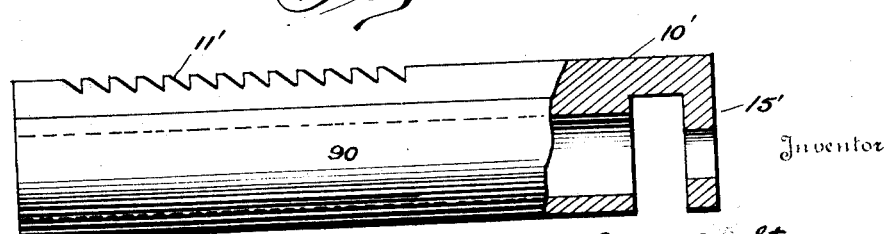

Patented May 8, 1928.

1,668,876

UNITED STATES PATENT OFFICE.

ROBERT D. STROUP, OF MARFRANCE, WEST VIRGINIA, ASSIGNOR OF ONE-THIRD TO H. S. NELSON, OF LESLIE, WEST VIRGINIA, AND ONE-THIRD TO JOHN B. LAING, OF LEWISBURG, WEST VIRGINIA.

BRAKE MECHANISM.

Application filed July 25, 1923. Serial No. 653,751.

This invention relates to brake mechanism and more particularly to such mechanism wherein the brake is positively locked in operative position so that it cannot be released by chance or accident until such release is desired by the engineer or other operator.

Attempts have been made in the prior art to secure a positively locked brake. It has been sought primarily to insure positive braking action to prevent for example runaway trains, due to failure of air pressure or for other reasons. It is obvious, for example that in fluid or electrically operated brakes, if at any time there is a failure of the fluid pressure or of the electric current, the brakes will cease functioning. Then too when cars are shifted from a train to a siding, leakage of air will gradually unset an air brake so that a car standing on a grade would soon run away. But the devices of the prior art referred to above, which have sought to overcome these difficulties, were themselves so complicated and costly that they proved inoperative and impracticable. One of the chief reasons for this was that such prior art devices required double sets of mechanism: one for locking the brakes, and the other for releasing them. The changes thus required in such devices from the brakes in use at present made the change prohibitive.

One of the objects of this invention is to provide locking mechanism for a brake which will be positive and under the control of the engineer or other operator at all times.

Another object of this invention is to provide such locking mechanism of simple and efficient construction.

A further object of this invention is to provide simple and efficient releasing mechanism for the locked brake.

A further object of this invention is to eliminate the use of retainers.

A still further object of this invention is to provide such mechanism so that it may be applied to the brakes now in use with a minimum replacement and consequent scrapping of the old working parts.

Other and further objects and advantages of this invention will appear from the more detailed description set forth below by way of illustration, in connection with which description the drawings show in Figure 1, a plan view of the brake operating mechanism; in Figure 2, a side elevation of this device; in Figure 3, an end view of the device; in Figure 4, a vertical sectional view through the center of the mechanism; in Figure 5, a detail partly in section of the releasing and locking pawls, after initial operation; in Figure 6, a detail partly in section of the releasing pawl in operative position; in Figure 7, a detail partly in section of the holding bar, tripping arm, and piston; in Figure 8, the brake mechanism in operative position; and in Figure 9 a modification of the device; Figure 10, a modification of the holding bar.

But it will be understood that this description and drawings are to be taken as illustrative only, and not by way of limitation, since various changes and modifications may be made in the devices illustrated and described, by those skilled in the art to which it appertains, without departing from the spirit and scope of this invention.

In general it will be seen that this invention comprises exceedingly simple means for positively locking and releasing brakes which may be applied to brakes of all kinds whether operated manually, electrically, or by fluid pressure, for example air, steam, etc. For purposes of illustration however the device is shown in use with air pressure brakes.

In its fundamental aspect the invention sets forth means operated by the existing air brake cylinder to lock the brake in operative position after it has been set, and means for releasing the locking mechanism also operated by the same cylinder. As a result it is possible to make use of practically the present equipment on trains with but slight modification. As set forth above, this invention may be applied to any type of brake, although it is illustrated with an air brake. But all that is required is that there shall be a holding bar or its equivalent, which is operated by the brake operating mechanism in its usual course of operation. This bar is then locked by the locking means, and may be subsequently released by the releasing means. It is immaterial for the purposes of the present invention whether the holding bar is operated by fluid pressure, electrically, or otherwise. Its application to any of these brakes will be obvious from the detailed description.

In the following specific embodiment of this invention, there is shown by way of illustration, the conventional brake cylinder 1 within which reciprocates the usual piston 2, actuating piston rod 3, which extends through the cylinder head 4. In this modification of the invention, the usual cylinder head is replaced by one similar to one shown in the drawings. This cylinder head 4 thus carries a small cylindrical chamber 5, through the opening of which the piston rod 3 extends. Upon this chamber 5 there are two strips 7, 7 which act to form a channel 8 in which the holding bar 10 reciprocates.

The holding bar 10 carries a rack 11 on its upper face which extends from the inner end of the bar for about half of its length although this exact distance is governed by other considerations, for example by the requirements of the I. C. C. who require a certain minimum distance of operation before brake action shall commence. At the point where the rack ends, the upper face of the holding bar is preferably beveled as shown at 12, up to the face 13 of the bar 10. On its outer end 14, the bar 10 carries a depending ear 15 provided with an aperture or opening 16 through which opening the brake rod link 20 passes to the brake rod, and serves to transmit the motion from the piston rod to the brake rod, whereby the brake is operated. Due to the bifurcated ear 22 of the link, by means of which it is connected to the brake rod, when the bar 10 occupies the dotted position shown in Figure 2, the link cannot move inwardly, but its movement in that direction is obviously limited by the ear 15. On one side of the bar 10 there is formed a groove 19 which at its outer end 20 is beveled to the side of bar. This groove is made to receive the releasing pawl described below. At the inner end of the bar 10, it is cut away in from the side 21 across the groove 19.

Caps or blocks 30 and 31 serve to close the channel 8 partially, and also coact with strips 7, 7 to form a seat for the housing 32. This housing comprises an upright member 33 cut away to form a channel 34 within the arms 35, 35 of the member 33. This housing is adapted to seat on the exposed portions of the strips 7, 7, between the caps or blocks 30 and 31, so that the channel is closed thruout its length, but is open on both ends. The lower end is thus open to the bar 10, while the upper end of the channel 34 receives the locking pawl.

This locking pawl 40 is cut away as at 41 to form an opening for purposes described below. The pawl is beveled at its lower end 42 so that it can coact with the teeth of the rack bar 10. At one side of the pawl, a longitudinal channel 43 is cut to receive a releasing pawl 50.

The releasing pawl 50 is pivoted at 51 for transverse movement in the channel 43, the arm 35 adjacent this pawl being cut away as at 36 to allow such movement. The pawl 50 has its lower end extended beyond the beveled edge of the locking pawl 40, to form an extension 52. The releasing pawl 50 is spring pressed as shown at 54 so that in its normal position the releasing pawl presses against the side 21 of the rack bar. In its operative position however, the pawl 50 rides in the groove 19 of the rack bar.

Positioned above the housing 32, are two arms 70, 70 attached to the arms 35, 35 of the housing. The arms 70, 70 extend over the cap or block 31, and are cut away as shown at 72, 72 to form a bearing for the rocking arm 73. This arm 73 carries a lug 74 rigidly attached thereto as at 75. The lug extends within the opening 41 adjacent to the upper part thereof, so that when the rocking arm is rocked counterclockwise on its bearings, the lug serves to raise the locking pawl in the channel 34. In order to retain the locking pawl in contact with the teeth of the holding bar 10, a block 44, held in place in any desired way, is reposed against the action of a spring 45, all within the opening or passageway 41. The spring 45, acting between this block and the lower edge of the opening or passageway 41, serves to press the locking pawl down against the teeth of the bar 10. The spring 45 may be retained in proper position by means of any ordinary securing devices, such as lug 46 in the block and recess 47 in the locking pawl.

The end of the rocking arm 73 is square-shouldered to receive a rigidly connected arm 77 which carries a dog 78 pivoted for free clockwise movement only to arm 77 as at 79. If moved counterclockwise it moves the arm 77.

Further there is also attached to the piston 2, a trip rod 80, formed at its outer end with an ear 81, which is designed to ride against the dog 78, when the piston is operated so that the movement of the piston carries the ear against the dog, trips the latter, which in turn causes the rocking arm to move and actuate the locking pawl.

When the device has been assembled with the parts related as described above, it is ready for use and operates as follows. When the engineer applies the brake, the piston rod moves outwardly, and by means of the brake rod the brakes are brought into operative position. At the same time, the piston moves against the inner end of the bar 10, carrying it out until, when the movement has been sufficient, the teeth of this rack engage the pawl 40, which then locks the rack, and consequently the brake rod in the braking position. Now at this time regardless of what happens either in the air line or within the cylinder, the brake rod is positively locked in position, so that the brakes cannot be released until the engineer under whose control the entire mechanism is placed, desires to do so. In this way it will be seen, that although the air pressure in the line may vary, or decrease due to leakage, the brakes are positively locked so that the train cannot move until desired. In this connection, attention is called to the fact that under I. C. C. specifications, the brake rod, or piston rod, must move a minimum distance (about three and one half (3½)) inches for leakage groove, before the brake shall begin to operate. Advantage is taken of this fact in the present invention as set forth above. The rack bar is not toothed thruout its entire length, but is left untoothed in that part of the rack bar that will ride under the locking pawl during the travel of the piston thru the distance referred to above. Consequently at this time when the brakes are being set, the dog is tripped by the ear on the sliding arm 80, but since the rack bar at this point is not toothed, the pawl immediately drops back to its normal position, as does the releasing pawl. When the brakes are thus once set and locked as described above, the piston and piston rod may return to normal position and do so, under the action of the spring, described above, the ear on the sliding arm 80 riding under the dog without tripping it in this reverse movement, that is without reciprocating the racking arm due to the pivoted connection between the arm and the dog.

When however, it is desired to release the brakes and allow them to cease their braking action, the engineer once more applies the brake but only sufficiently to move the piston a small distance namely until the sliding arm thru its ear, trips the dog. In other words, regardless of the pressure that has been used to set the brakes, a minimum pressure only (1–2 lbs.) is required to release them. In this way a remarkable saving of air is obtained. At this time, the locking pawl is raised as described above. The releasing pawl is thus raised until it rests on the groove 19 and due to the spring 54, it is maintained on this groove. In this position, the releasing pawl, prevents the locking pawl from dropping into contact with the holding. The locking pawl thus being held out of operative position the bar is free to move inwardly until it once more contacts with the piston, when it is in normal position and remains there. At the same time that the bar is travelling inwardly, the releasing pawl rides on the groove 19, until it reaches the beveled edge of this groove and the side face of the rack bar. As this point is reached and on further movement of the rack bar, the releasing pawl is gradually urged off of the groove until it drops beside the rack bar to its inoperative position. When this has happened, the parts are all restored to normal position, and the brakes are ready to be operated again.

However, when a car is switched off of a train or line of cars, it is desirable to provide means whereby the brake may be released and restored by hand. This is accomplished as follows. There is attached to the tripping arm 77 at a point preferably as far as possible and convenient from its upper end, a chain or equivalent device 80', which is adapted to be wound up or pulled over by the vertical hand brake staff or equivalent staff 81', similar to that now in use for hand brakes. It is obvious that when the element 80 is pulled over or wound up by operation of hand wheel or equivalent element 83, the rocking arm 73 will be operated to release the locking pawl so that the brake rod may return to its normal position under the action of the spring.

A modification of the air cylinder piston is shown in Figure 9. In this modification the holding bar 10 is formed integrally with the sleeve 90, within which sleeve the piston rod operates. The spring 91 which serves to return the piston to normal position surrounds all the parts, while the spring 92 for returning the holding bar to normal position is preferably within the sleeve and about the piston rod.

It is possible in some uses of this invention to eliminate the releasing pawl from this mechanism, and to use the device without it. This elimination of the releasing pawl allows one to drop from a higher to a lower pressure without first going through the releasing operation. This result is possible for the following reasons. When the brakes have been set and locked, the piston and the trip rod will return to their normal position. As soon now as it is desired to lower the pressure in use, the engineer will start to operate the brakes. When the ear of the trip rod trips the dog and consequently rocks the rocking arm, the locking pawl will be raised above the rack and release the bar. The bar will then return towards its inner position. At the same time, the brakes will throw the push rod etc. back so that they tend to resume their normal position. This happens almost instantaneously. On passing the point now where the dog is tripped, the further application of the pressure enables the engineer to set the brakes at the desired position.

Having thus set forth my invention, I claim:

1. In brake mechanism, a holding bar, locking means operated by said holding bar to lock the latter in operative position, and releasing means to release said locking means.

2. In brake mechanism, a reciprocating holding bar, means for locking the bar on initial movement, and means for releasing the holding bar on further movement thereof.

3. In brake mechanism, a fluid pressure cylinder, a reciprocable piston within said cylinder operating under said fluid pressure, a holding bar operated by said piston, means for locking said holding bar upon movement of said piston, and means for releasing said locking means upon further operation of said piston.

4. In brake mechanism, a holding bar, means for causing movement of said bar, means for locking said bar after such movement, and means for releasing said locking means, the releasing means being operated by the means for causing movement of the holding bar.

5. In brake mechanism, a fluid pressure cylinder, a piston within said cylinder operating under said fluid pressure, a brake rod operated by said piston, means for locking said brake rod in operative position upon reciprocation of said piston, and means for releasing said locking means upon further reciprocation of said piston.

6. In brake mechanism, a holding bar provided with a rack, a pawl engaging said rack, to lock the bar against movement in one direction, and means including a releasing pawl for releasing said locking pawl.

7. In brake mechanism, a holding bar provided with a rack, a pawl engaging said rack to lock said bar against movement in one direction, a groove in said bar, a releasing pawl carried by said locking pawl and adapted to ride in the groove aforesaid and to keep the locking pawl from operative engagement with the said rack.

8. In brake mechanism, a holding bar provided with a rack, a pawl engaging said rack to lock said bar against movement in one direction, a groove in said bar, a releasing pawl carried by said locking pawl and adapted to ride in the groove aforesaid and to keep the locking pawl from operative engagement with the said rack, and means for removing said releasing pawl out of said groove so that the locking pawl may reengage said rack.

ROBERT D. STROUP.